April 14, 1964 R. E. GORDON 3,128,598
AFTERBURNER FUEL CONTROL
Filed April 24, 1956 6 Sheets-Sheet 1
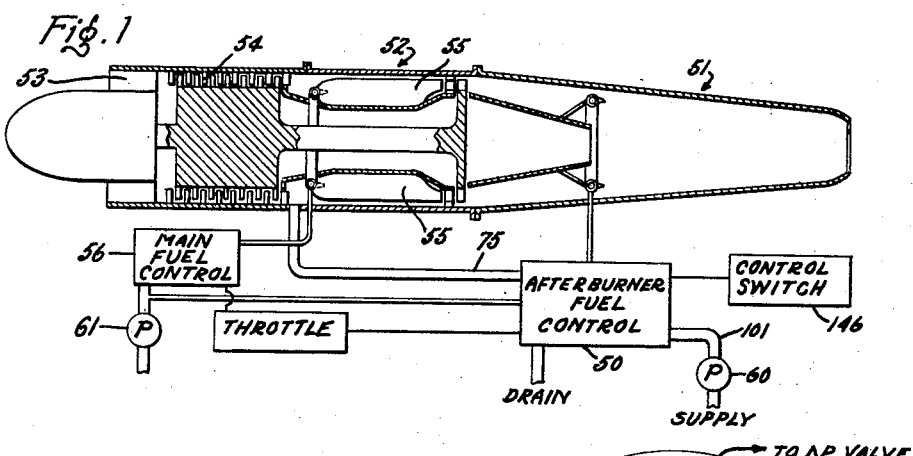
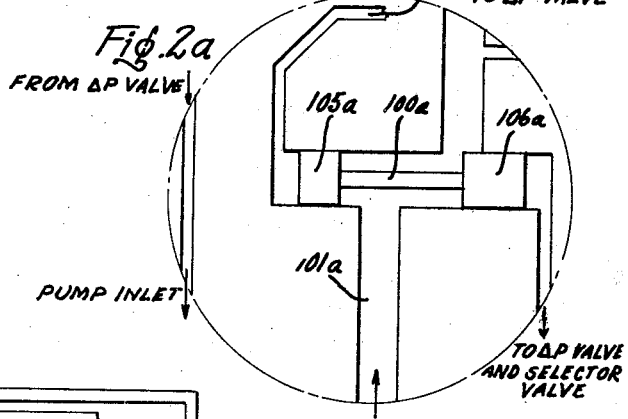
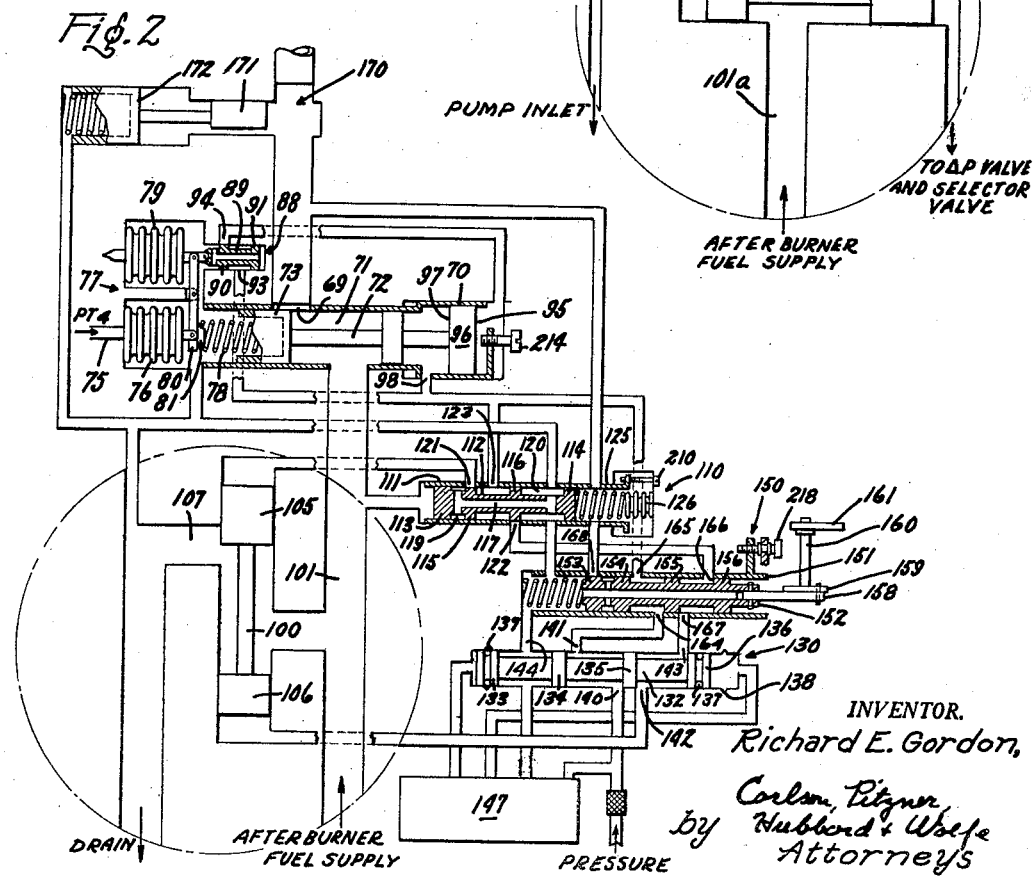
INVENTOR.
Richard E. Gordon,
by Carlson, Pitzner, Hubbard & Wolfe
Attorneys

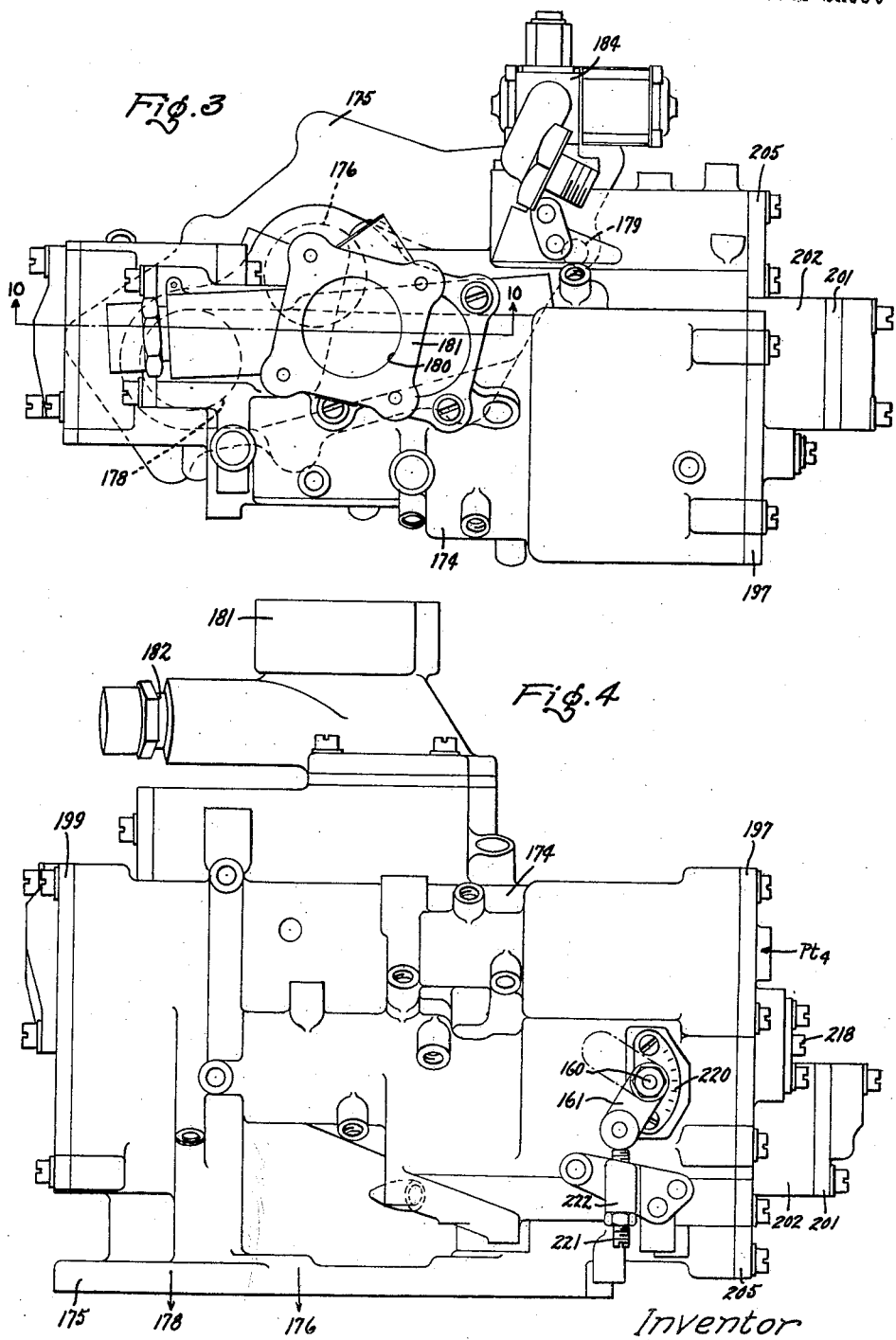

April 14, 1964
R. E. GORDON
3,128,598
AFTERBURNER FUEL CONTROL
Filed April 24, 1956
6 Sheets-Sheet 3
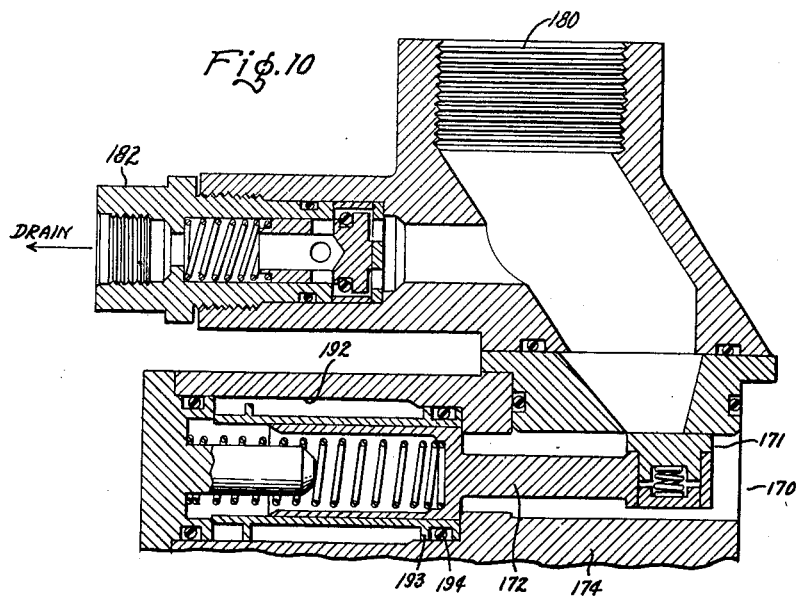
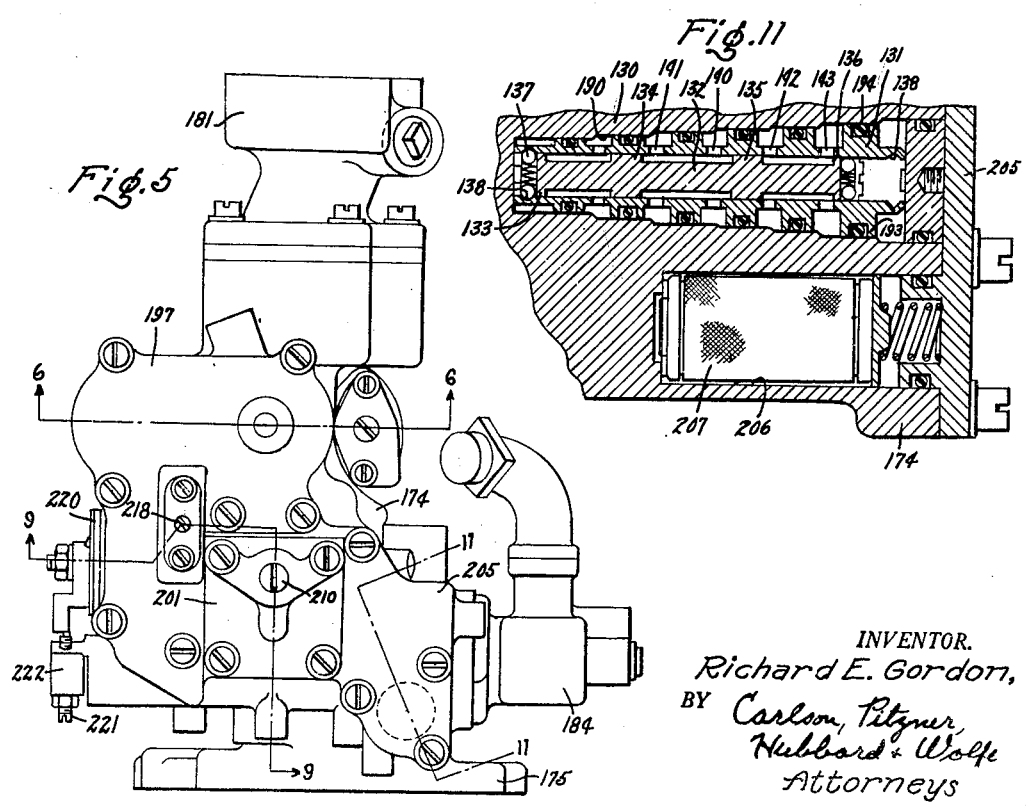
INVENTOR.
Richard E. Gordon,
BY Carlson, Pitzner,
Hubbard & Wolfe
Attorneys April 14, 1964   R. E. GORDON   3,128,598
AFTERBURNER FUEL CONTROL
Filed April 24, 1956   6 Sheets-Sheet 4
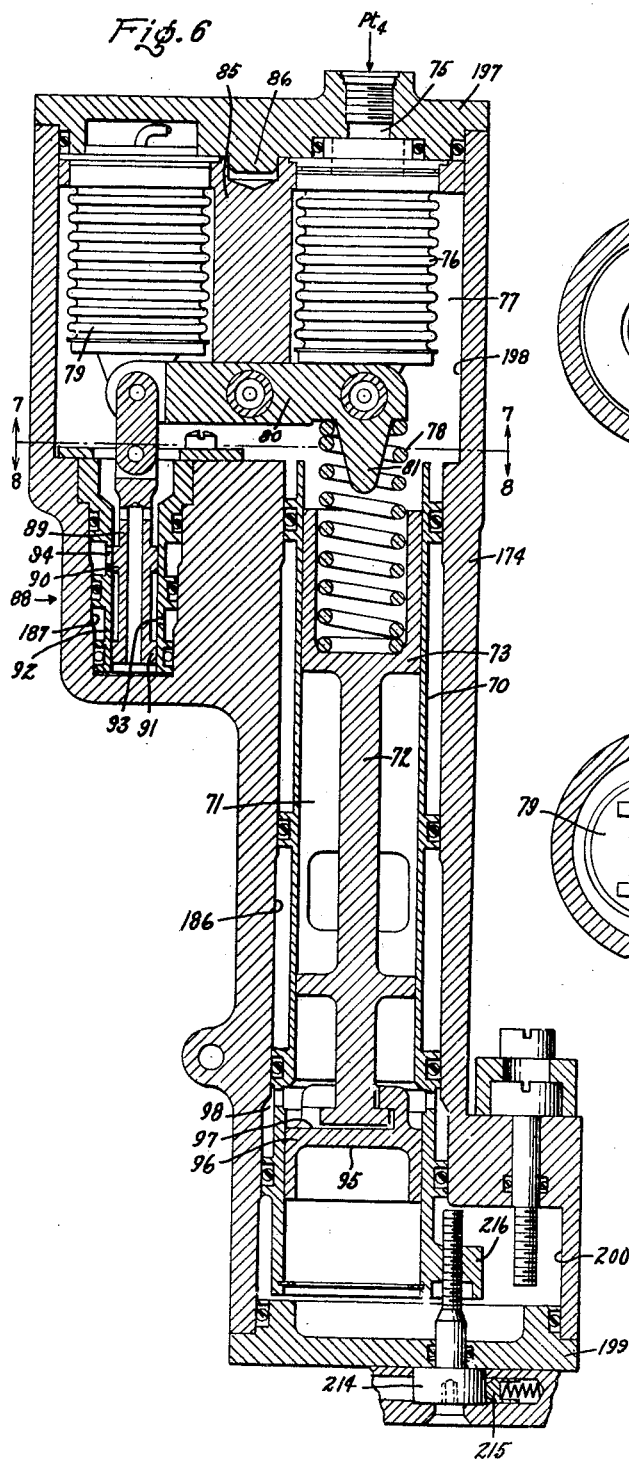
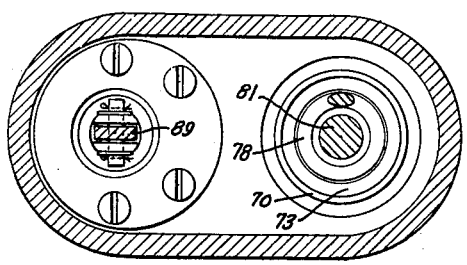
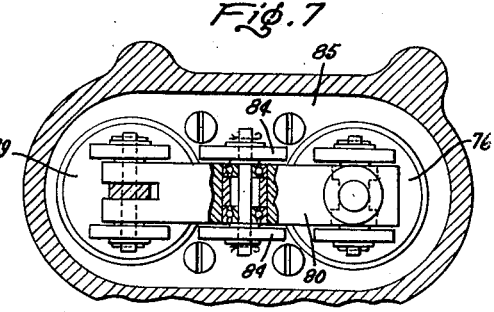
INVENTOR.
Richard E. Gordon,
BY Carlson, Pitzner,
Hubbard + Wolfe
Attorneys

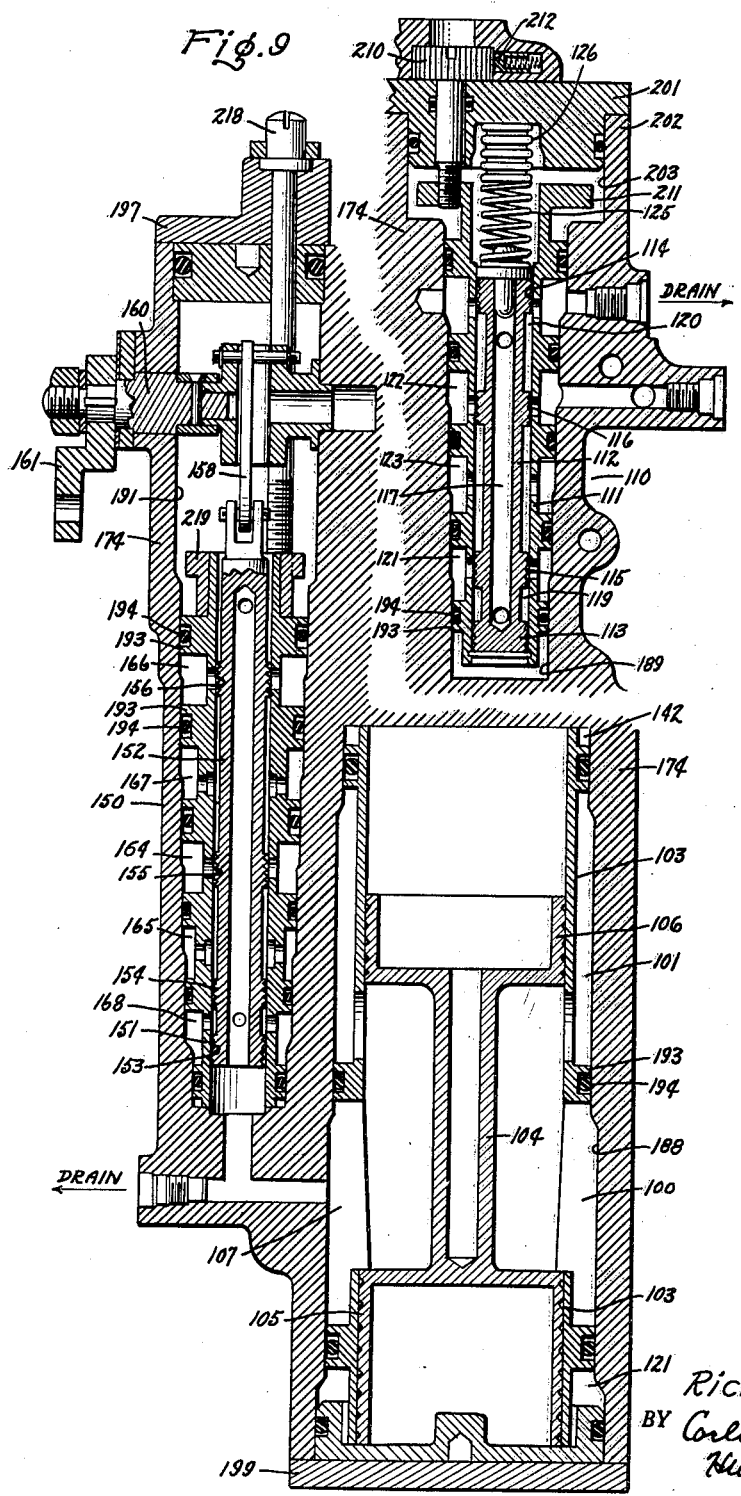

April 14, 1964 R. E. GORDON 3,128,598
AFTERBURNER FUEL CONTROL
Filed April 24, 1956 6 Sheets-Sheet 6
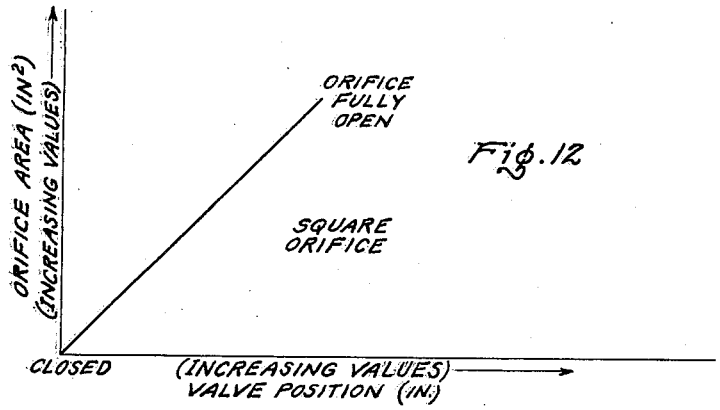
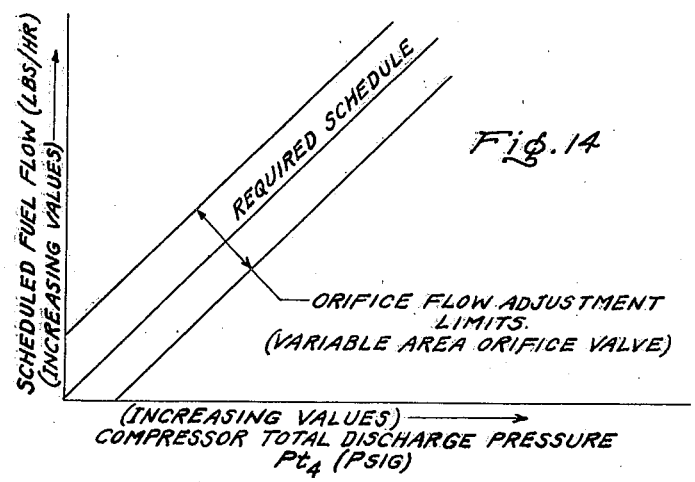
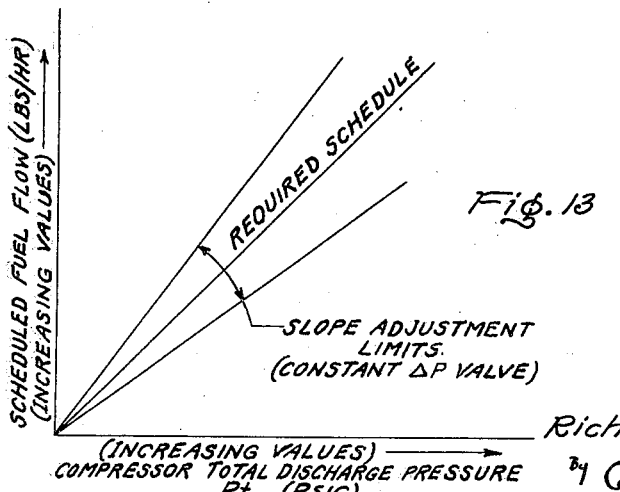
INVENTOR.
Richard E. Gordon
By Carlson, Pitzner,
Hubbard & Wolfe
Attorneys

United States Patent Office 3,128,598
Patented Apr. 14, 1964

3,128,598
AFTERBURNER FUEL CONTROL
Richard E. Gordon, Ypsilanti, Mich., assignor to Ex-Cell-O Corporation, Detroit, Mich., a corporation of Michigan
Filed Apr. 24, 1956, Ser. No. 580,378
6 Claims. (Cl. 60—35.6)

The present invention pertains to controls for the afterburners of turbojet engines. Such afterburners increase the thrust of the engine during take off or other periods of maximum demand by burning additional fuel in a tail section of the engine downstreams of its turbine. In that way the exhaust gases issuing from the turbine are reheated and the thrust increased.

For such service the fuel fed to the afterburner must be accurately proportioned to the mass of air delivered by the engine's compressor in order to assure safe as well as efficient combustion.

The general aim of the present invention is to afford a new and improved afterburner control for a turbojet engine which will accurately proportion the fuel supplied in reference to the air available, and over a wide range of compressor deliveries and without impairment in fidelity of operation despite abrupt and wide changes in altitude.

The subject afterburner control is characterized by the ease with which identical operating characteristics can be afforded in successive units, or so called "repeatability" of results in successive units, as well as in successive operations in the same unit.

A major reduction in weight of the controls is also accomplished by the novel unit about to be described.

Of how such objectives and advantages, together with positiveness and accuracy of operation, as well as how still other advantages are realized, more will appear in connection with the description of the presently preferred embodiment of the invention illustrated in the drawings, and in which:

FIGURE 1 is a schematic layout of a turbojet engine equipped with afterburner controls embodying the present invention;

FIG. 2 is a diagrammatic layout of the afterburner control system;

FIG. 2a is a diagrammatic layout of an alternative slave type metering valve that may be employed in the system of FIG. 2 when utilizing a fuel supply from an impositive displacement pump (such as a centrifugal type) rather than from a positive displacement pump (such as a gear type);

FIGS. 3, 4 and 5 are respectively top, front, and end elevations of the afterburner control unit indicated schematically in FIG. 1;

FIG. 6 is a sectional view taken substantially in the plane of line 6—6 of FIG. 5 and showing a variable area orifice valve and its associated scheduling valve.

FIGS. 7 and 8 are sectional views taken substantially in the planes of lines 7—7 and 8—8 respectively of FIG. 6.

FIG. 9 is a sectional view taken substantially in the plane of line 9—9 of FIG. 5 and showing a slave type metering valve and its controlling constant $\Delta P$ valve along with a throttle-set override valve.

FIG. 10 is a sectional view taken substantially in the plane of line 10—10 of FIG. 3 and showing a line pressure operated cut-off valve and drain valve.

FIG. 11 is a sectional view taken substantially in the plane of line 11—11 of FIG. 5 and showing an on-off selector valve and fuel filter.

FIG. 12 is a graphical representation of the relationship between the size of the orifice opening and the position of the variable area orifice valve.

FIG. 13 is a graphical representation of the relationship between the total discharge pressure of the engine compressor and the fuel flow through the orifice valve.

FIG. 14 is a graphical representation of the relationship between the total discharge pressure of the engine compressor and the fuel flow through the constant differential pressure valve.

The presently preferred embodiment of the invention has been illustrated and described in some detail in order to enable those skilled in its field to apprehend fully its principles and to produce such units using only the ordinary skills of their specialty. No inference should be drawn, however, from the detailed character of the description that the invention is limited in its employment to any such details of construction. On the contrary, a wide variety of embodiments are possible, will readily occur to those skilled in this field, and the intention is to cover all alternatives, substitutions and equivalents falling within the spirit and scope of the invention as expressed in the appended claims.

Referring more particularly to the illustrated embodiment of the invention (see FIG. 1), an afterburner control unit 50 embodying the same has been shown located to control the supply of fuel to the afterburner 51 of a turbojet engine 52. Neither the engine itself nor its other accessories constitute the present invention and may, of course, take a wide variety of forms. Hence, they have been illustrated mainly in diagrammatic fashion to indicate more or less generally the type of environment or installation in which units of the present invention find employment.

Of the indicated engine installation, suffice it to say that air is sucked into the engine through a front intake 53, is pressurized in passing through a compressor 54, and forced into the combustion chambers 55. Fuel, regulated by a main fuel control apparatus 56, is sprayed into the compressed air and ignited in the combustion chamber. The burning gases expand rapidly and blast their way out of the rear of the engine giving a jet thrust and passing in transit through a turbine 57 drivingly connected to the compressor 54. To increase the thrust during periods of peak demand, additional fuel is sprayed into the gas stream in the afterburner 51 and ignited to augment the gas blast.

Fuel for the afterburner is supplied by an engine driven, positive displacement pump 60, and the fuel so supplied is controlled by the novel unit 50. Fuel is also supplied to the afterburner control unit from the engine's main fuel pump 61 to afford pressure fluid for the actuation of certain hydraulic valving as will shortly appear. The fuel itself may be any of the variety of liquid hydrocarbons commonly employed in turbojets such, for example, as the wide-cut fuel commonly used today and designated as JP-4.

Basically, the afterburner control here disclosed accomplishes its controlling functions by interposing in the stream of fuel an orifice whose area is proportioned to the prevailing rate of air delivery from the compressor, and retaining a constant pressure drop across this orifice. In that way the mass of fuel admitted through the orifice may be accurately proportioned to the mass of air delivered.

Such an orifice is, in the present unit, indicated at 69 (FIG. 2) in the sleeve or bushing 70 of a variable-area orifice valve, designated generally as 71. The axially slidable spool 72 of this valve has a land 73 located to move across the orifice 69 and thus vary its effective or open area. With a rectangular orifice, as shown, the open area of such orifice is a straight-line or linear function of valve position (see FIG. 12) but, of course, other orifice shapes (for example, triangular) may be used if other proportionalities of orifice area to valve displacement are desired.

To signal variations in compressor air delivery, the compressor discharge pressure $Pt_4$ is used as a criterion. Air at such pressure is delivered through a line 75 to an extensible metal bellows 76. Pursuant to one aspect of the invention, that bellows 76—and this is most important—is incorporated in a null point bellows system 77 so that its total travel need not be more than a very small increment of distance such, for example, as 0.030". By a "null point bellows" system or mechanism is meant a device embodying a fluid-actuated bellows so arranged that expansion or contraction of the bellows from a null or mean point automatically causes a corrective change in the resistance of the mechanism to applied fluid pressure. When it is observed that in engines of the character here contemplated the compressor discharge pressure is likely to vary from zero to over 300 p.s.i., it will be appreciated that a bellows which responded in direct proportion would, for practical purposes, have to have a travel of the order of at least 0.300" or ten times that here employed. Such a long bellows travel introduces most painfully difficult problems of tolerance and repeatability. Not only does the ratio of bellows displacement to pressure vary from one unit to another but hysteresis effects are also experienced. Such difficulties are completely obviated with the present null point arrangement, entailing as it does only a minute overall travel (of the order of a few thousandths of an inch) for the bellows no matter how great the range of applied fluid pressure may be.

In the instant embodiment of the invention, the bellows 76 is opposed by a helical compression spring 78. That spring is interposed between the bellows 76 and the spool 72 of the variable area valve 71. As pressure rises within the bellows, the opposed spring loading is increased by motion of the spool 72 (induced by means later described) to open the orifice 69 correspondingly. Likewise, as pressure falls in the bellows the spring is relaxed by an opposite motion of the valve spool. Every departure of the bellows from its null point initiates, as later described, a corresponding corrective movement of the valve spool, and hence, a corresponding change in the compression of the spring. Accordingly, the spring and bellows are retained in balance, never depart far from balance at any time, and as a result the bellows never changes length by more than a few thousandths of an inch during the whole range of internal pressures to which it may be subjected. For that reason the inaccuracies are avoided which would otherwise arise if the builder attempted to provide a bellows which would uniformly distend or collapse for each increment of internal pressure change, and if the builder attempted to reproduce precisely those same characteristics in each of a series of bellows for a group of replaceable control units.

There remains, however, the problem of establishing a reference value for the bellows 76 and spring 78 so that the mechanical system which they constitute will always repeat its performance in terms of variations in absolute pressure. That is a particularly vital consideration in aircraft where the exterior pressure on the bellows may change, not only very widely, but abruptly, with changes in altitude at various climbing and diving rates for an aircraft in which it is used. Such a reference level of operation is established here by utilizing a second bellows 79. It is evacuated, for example, to a pressure of about 5 microns of mercury, and is connected to the main bellows 76 by a walking beam or lever 80. The latter (FIG. 6) is pivoted at its opposite ends to the respective bellows, a boss 81 on it serving as a centering seat for the spring. At its mid-point, the lever is pivoted in a yoke 84 (FIG. 7) at the end of a stem 85 rising from a base 86 to which the outer ends of the two bellows are fixed. Clearance between the lever and the base of the yoke need only be enough to permit movement of the order of 0.030" for the ends of the lever.

The outer surfaces of both bellows are subjected to the same external fluid pressure. In this instance the space about them is in communication with the drain side of the system (FIG. 2). Hence, any alteration in outside pressure on the main bellows 76, incident for example to a change in altitude, is accompanied by a precisely equal change in the pressure applied extensively to the evacuated bellows 79 which is linked to it by the lever. So the two compensate each other, and the main bellows distends or contracts only in response to changes in absolute values of pressure applied in it.

To effectuate the sort of action described above it is necessary that each departure of the main bellows from its null point should initiate a movement of the variable area valve's spool 72 in a corresponding reverse direction to correctively restore the mechanical system to balance. For that purpose a servo or scheduling valve 88 (FIG. 6) is arranged to move in unison with the bellows and to dispatch fluid for hydraulically shifting the variable area valve's spool in the required direction. In the present instance, the scheduling valve 88 is a spool-type three-way valve comprised of a spool 89 with a pair of space lands 90, 91 and slidable within a sleeve or bushing 92. The spool is pivotally connected directly to the lever 80 so that it moves in unison with the main bellows 76.

In one extreme of its travel, the scheduling valve 88 dispatches pressure fluid from a port 93 communicating with a source of pressure fluid (in the present unit, from the main fuel pump) port 94 to the outer or larger area face 95 of a differential actuator head 96 on the variable area valve's spool 72 (FIGS. 2 and 6). Pressure fluid from the same source is applied at all times to the inner or smaller area face 97 of such actuator head 96 (FIG. 2) through a port 98 in communication with said source. In the opposite extreme position of the scheduling valve spool 89, the larger area face 95 of the actuator head 96 is connected to drain. Hence, the variable area valve's spool will, in the first mentioned instance, be forced in an opening direction for increasing the area of its fuel orifice and to compress the spring 78, while in the second mentioned instance, the spool will be forced in an opposite direction. In both cases the operation is under the influence of a positive fluid pressure so that any tendency to stick or bind will be overcome without relying on a spring. Moreover, variations in the fluid pressure utilized for actuation are inconsequential for once the scheduling value is returned to centered or neutral position, the mechanical system (bellows and spring) are back to their null point and the port 94 is blocked, as shown for example in FIG. 6, locking the fluid behind the large area face of the actuator head.

In the mechanism described above the spring 78 constitutes what may be aptly termed a mechanical feed-back for the servo system that operates the variable orifice valve 71. For not until the latter valve has actually reached the new setting called for by a change in pressure in the bellows 76 will the system be restored to balance and the cource of actuating pressure blocked off from the valve. Thus, if the valve spool 72 should stick, pressure will continue to be applied to it for moving the same until it actually reaches its new position. Only then will the scheduling valve be returned to neutral by the spring.

Even within wide limits changes in pressure of the operating fluid for valve actuator are inconsequential since it is of a differential type. The basic control function postulated earlier entailed not only change in the effective area of the orifice in proportion to compressor air delivery, and which is here accomplished by the means so far described, but also maintenance of a constant pressure drop across that orifice. For the latter purpose, incoming fuel may either be controllably metered out of the fuel supply line 101 or controllably metered into it. Both arrangements are here illustrated (FIGS. 2 and 2a, respectively). For the former, a by-pass slave valve 100 is arrange to divert fluid from a fuel supply line 101 leading from a positive displacement type pump (such as a gear pump), upstream of the main orifice 69, and back to drain. Such valve comprises (FIG. 9) a sleeve or bushing 103 which slidably receives a spool 104 with spaced lands 105, 106. The land 105 controls the degree of opening of the outlet port 107.

Rather than operating the by-pass valve 100 directly in response to variations in pressure drop across the orifice 69, and which could be readily done, it has been concluded that it is preferable to make it a slave valve operated by a separate servo or constant ΔP valve. The expense and weight of the latter are more than offset by several rather subtle and unobvious factors. For one thing, it makes it easier to introduce compensation or modulation in response to other control factors (temperature change in the fuel itself being the illustrated example). Also, by making the by-pass valve a slave, the problems of compensating for variations in flow rate in it are obviated in designing the operating circuits. Moreover, it is possible to realize a proportioning type of control and in which the rate of response of the valve is proportioned to the degree of pressure variation at the orifice which brings about the resetting of the valve.

In the illustrated unit the by-pass slave valve 100 is controlled by a constant ΔP valve 110. The latter is shown (FIG. 9) as a spool-type four-way valve having a sleeve or bushing 111 in which is slidable a spool 112 having end lands 113, 114 and a pair of spaced intermediate lands 115, 116 with a central bore 117 connecting grooves 119, 120 at the opposite sides of such intermediate lands 115, 116. In its mid or neutral position, shown in FIG. 2, the intermediate lands 115, 116 block ports 121, 122 communicating with opposite ends of the slave valve 100 and thus locking the latter's spool 104 in position. Shifting the ΔP valve spool 112 is one direction connects one end of the slave valve 100 to a pressure fluid source through a port 123 in the ΔP valve (FIG. 9), and the other to drain while movement in the opposite direction reverses those connections (FIG. 2). As in the case of the variable area valve, fluid pressure from the main fuel pump is used for actuating purposes.

The ΔP valve 110 itself is shifted in response to changes in pressure drop across the main orifice 69. For that purpose pressure is applied to opposite ends of its spool from the respective upstream and downstream sides of the orifice (FIG. 2). The downstream pressure is augmented by a coiled compression spring 125 so that the pressure drop maintained is fixed by the spring loading required to locate the spool in neutral or mid position. Variations in absolute value of the fuel pressure do not affect the ΔP valve as so constructed, only the pressure drop does so. Since the spring 125 operates in what amounts to a null point system, variations in spring rate from unit to unit are inconsequential.

It is desirable to introduce a compensation to keep constant the weight of fuel flowing to the afterburner despite changes in temperature of the fuel, at least within some reasonable range of temperature that is likely to be encountered (for example, −67° F. to +140° F.). To that end, a bi-metal device 126, here shown as a bi-metal bellows, is arranged to form a seat for the spring. It will be clear to those skilled in the art that other bi-metal devices of familiar form, such as discs may be used if desired. Fuel to the afterburner is circulated around this device, causing it to expand or contract with changes in temperature, and correspondingly modulate the action of the ΔP valve.

In FIG. 2a is shown an alternative arrangement for a slave valve 100a to replace the slave valve 100 in the event fuel is supplied to the afterburner from a variable displacement pump, such as a centrifugal pump, rather than from a positive displacement pump. In such event the slave valve 100a functions to meter the fluid into the unit for retaining a constant pressure drop across the orifice rather than variable diverting fluid for the same purpose and as heretofore described. In either case, the slave valve variably controls the supply of fluid in a manner to retain a constant pressure drop across the orifice.

As indicated in FIG. 2a, the slave valve is interposed directly in the line 101a leading from the fuel inlet to the variable area valve. Just as before, its opposite ends 105a, 106a are, for actuating purposes, supplied with operating fluid by lines leading from the ΔP valve. The degree of opening of the slave valve is thus proportioned, by the ΔP valve, to the pressure drop across the variable area valve. Consequently, the slave valve meters fluid into the system at a rate to correctively retain a constant drop across the variable area valve. With the slave valve 100a so installed, the low pressure return system is connected directly to pump inlet rather than through a by-pass return as in FIG. 2.

Valving is also desirably incorporated in the afterburner control unit to facilitate safe and effectual initiation of operation, and shut-down of the afterburner. This is particularly desirable since the unit is customarily subject only to occasional use.

In the instant design a selector valve 130 is provided (FIG. 11) for cutting on and off the supply of pressure fluid to the actuating circuits of the unit. Such valve comprises a sleeve or bushing 131 in which is slidable a spool 132 with four spaced lands 133–136. The spool shifts between two extreme positions in each of which it is latched by a corresponding one of a pair of spring loaded balls 137 seated in a mating groove 138. In the position shown in FIGS. 2 and 11 the selector valve feeds pressure fluid from port 140 communicating with the main fuel pump to port 141 leading to the control system. Port 142 is at the same time connected to port 143 to afford a connection between the ΔP valve and the slave valve. In the opposite position, supply from the port 140 is directed, through port 142, to one end of the slave by-pass valve 104 for shifting it to full-dump position and the port 141 leading to the control system is connected through port 144, to drain, deactivating the same. In the event the alternative slave valve 100a is used with a variable displacement fuel pump (FIG. 2a), the same selector valve connection shifts it to full closed position, again deactivating the system.

A conventional, solenoid-operated four-way valve, indicated at 147, may be used to shift the selector valve to "on" or "off" position in response to throwing a control switch 146 by the pilot or other operator. With the solenoid "on" the valve directs pressure fluid to one end of the selector valve spool and connects the other to drain (FIG. 2) thereby shifting the selector valve to its "on" position shown. Conversely, deenergizing the solenoid valve reverses the connections to the end of the selector valve spool and restores it to "off" position.

A throttle set override valve 150 (FIG. 9) is interposed in the controls to insure a minimum throttle setting before the afterburner can be put in operation. For example, the engine may be such that the afterburner should be used only when the throttle is at least 80% open. In the illustrated installation the override valve comprises a sleeve or bushing 151 slidably receiving a hydraulically balanced spool 152 with four spaced lands 153–156. A link 158 pivoted to the end of the spool 152 connects it to an eccentric 159 fixed to a shaft 160 turner by a throttle lever 161.

When the throttle lever is turned for the required opening (e.g. 80% or more) the spool occupies the position shown in FIG. 2. In that position override valve port 164 leading from the port 141 in the selector valve is connected to port 165 leading to the variable area valve 71 (see FIGS. 2, 6, 9). Likewise ports 122 and 143 are interconnected, by override valve ports 166—167 establishing a conenction from the constant ΔP valve 110 to the slave valve 100. Whenever the throttle is at less than the required opening, however, the spool is in the position shown in FIG. 9. In the latter position, the port 164 is blocked, cutting off supply of pressure fluid to the orifice controls, and the port 166 is blocked cutting off the ΔP valve from one end of the slave valve. At the same time, a port 168 is opened to drain, thereby relieving pressure in the downstream side of the main orifice.

The latter relief of pressure serves to effect closing of a main cut-off valve 170 (FIGS. 2 and 10) and positively prevents further flow of fuel to the afterburner. The cut-off valve illustrated comprises a sliding gate 171 of disc shape and desirably made of carbon to minimize galling, and which is biased toward closed position by a spring urged plunger 172. Fluid pressure against that plunger compresses its spring for opening of the cut-off.

The components of the illustrated afterburner control 50 as so far described are, for the sake of compactness, arranged as a unit (FIGS. 3, 4 and 5). The unit comprises a single, lightweight aluminum body or housing 174 equipped with a mounting pad 175 that can be bolted in position on the engine. Afterburner fuel enters through an inlet 176 in the pad which has an O-ring seal to receive the supply line. O-ring sealed openings 178, 179 in this pad, also connect, respectively, to the low-pressure return line 178 and to a line supplying pressure fluid from the engine's main pump. The controlled quantity of fuel to be delivered to the afterburner is discharged at the opposite or upper side of the unit (FIG. 3) through an outlet 180 in a fitting or adapter 181 bolted to the unit and from that outlet to the afterburner. That same fitting also embodies a connection 182 to overboard drain line.

The solenoid valve 147 is housed in a separate unit 184 bolted to the side of the housing 174 (FIG. 5).

For ease in machining and assembly, the various valves 71, 88, 100, 110, 130, 150, 170 identified above are mounted in corresponding parallel bores 186–192 respectively opening from the ends of the housing 174. In each instance, the valve's sleeve or bushing is provided with a series of peripheral flanges 193 located at spaced points along it and externally grooved to receive corresponding fuel resistant rubber O-rings 194. Such flanges are located to constitute partitions segregating from each other a series of annular chambers surrounding the bushings and into which various ones of the valve ports open. Cored and drilled passages within the housing lead between various ones of such chambers, the connections being as shown schematically in FIG. 2, and as heretofore described.

More specifically, at the right end of the housing 174 (as viewed in FIG. 4) is a cover plate 197. It closes a recess 198 in which is mounted the bellows assembly 77 (FIG. 6), and into which opens the bore 186 receiving the variable area valve 71. At the opposite or left hand end of the unit (as viewed in FIG. 4), a cover plate 199 closes a recess 200 into which the bore 186 for the variable area valve 71 opens. A second bore 188, receiving the by-pass slave valve 100, is located beneath the bore 186 and is closed by the same left end cover plate 199.

The same right end cover 197 just described also closes the end of the bore 191 in which is mounted the throttle override valve 150. Another cover 201 over a projecting portion 202 at the right hand end of the unit closes a recess 203 into which the bore 189 for the ΔP valve 110 opens.

A lower portion of such right hand end of the housing 174 is fitted with a separate cover plate 205. It closes the ends of the bore 190 receiving the selector valve 130 and a bore 206 receiving a replaceable cartridge type filter 207 through which fluid passes in entering the control unit from the main fuel pump. Desirably, the bores for receiving the selector valve, throttle override valve, ΔP valve, and scheduling valve are stepped, as indicated, to afford a different diameter for each flange 193 on their respective bushings.

During initial assembly of the unit, as well as after overhaul, those being occasions when the unit can be put on a test stand, it is desirable that the unit afford adjustment facilities so that its operating characteristics can be altered as required to yield desired, optimum performance characteristics. For that purpose provision is made in the present unit for positionally adjusting the sleeves or bushings of the ΔP valve 110, the variable area valve 71 and the throttle-controlled override valve 150. Each of these adjustment mechanisms and its purpose will next be described.

The ΔP valve 110 is equipped with an adjusting screw 210 (FIG. 9) threaded in a tapped hole in a flange 211 on the outer end of the valve's sleeve 111. By turning that screw, the sleeve is adjusted axially. A spring detent 212 bearing against the knurled edge of the adjusting screw's head holds it against inadvertent turning. By so adjusting the sleeve position, the effective loading of the compression spring 125 is correspondingly adjusted, thus diminishing or increasing the pressure drop maintained across the main orifice. In other words, the slope of the characteristic pictured in FIG. 13 (compressor delivery pressure vs. fuel flow) is correspondingly raised or lowered.

In a somewhat similar manner, the sleeve 70 of the variable area valve 71 may be adjusted axially to alter, as desired, the ratio of compressor delivery pressure to scheduled fuel flow (see FIG. 14). In this instance an adjusting screw 214, equipped with a spring detent 215, is threaded in a tapped hole in a flange 216 on the sleeve to shift the latter axially.

Finally, in the case of the throttle-operated override valve 150, its sleeve 151 is equipped with an adjusting screw 218 (FIG. 9) extending down past the eccentric 159 and threaded in a flange 219 on the end of the sleeve. Turning this screw 218 serves to shift the sleeve axially, and thereby alter the minimum throttle setting at which this valve will permit functioning of the afterburner. An exterior quadrant 220 (FIG. 4) indicates throttle setting visually, and a headless screw 221 threaded in a boss 222 limits travel of the throttle lever 161 as required.

*Operation*

Operation of the novel afterburner control disclosed will, at least in general, be clear from the foregoing description. By way of recapitulation, however, reference may conveniently be made to the schematic layout of FIG. 2.

To begin with let it be assumed that the turbojet engine is running and with its throttle set at above 80% or such other value as the afterburner control unit has been set to require before the afterburner can be cut in, but that the afterburner has not yet been switched on. In such case the selector valve 130 will be in its "off" position and the override valve 150 will be in its "on" position (shown in FIG. 2). In such event the by-pass slave valve 100 is in its full dump position, and the cut-off valve 170 is closed so that all afterburner fuel is returned to drain and the load on the afterburner supply pump is substantially nil. The operating circuits for the ΔP valve 110 and the variable area valve 71 are dead.

To cut in the afterburner under such conditions, the pilot, or other operator, has only to flip a switch 146 to energize the solenoid valve 147. That same switch is, it may be mentioned, also customarily arranged to energize an ignition device (not shown) for the afterburner. Such energization of the solenoid valve snaps the selector valve 130 to its "on" position, thereby directing pressure fluid through the port 141 for control purposes, and connecting the slave valve 100 (at ports 142 and 143) to the constant ΔP valve 110. Accordingly, pressure fluid flows from the main fuel pump through the ports 140, 141 of the selector valve 130, thence through the ports 164, 165 of the throttle-controlled override valve 150, and thence not only to the port 98 leading to the inner face 97 of the variable area valve's actuator 96 but also to the port 93 of the scheduling valve 88.

During such starting conditions, the ΔP valve 110 will be shifted leftward (as viewed in FIG. 2), since fluid pressures were substantially absent and only the spring 125 was acting on its spool 112. Hence, the newly entering pressure fluid at the port 123 from port 165 is directed to the upper end 105 of the slave valve 100, closing it from its idle or full dump position. Accordingly, pressure builds up in the passages and forces open the shut-down valve 170. Delivery of fuel to the afterburner is, accordingly, begun.

Throughout all subsequent operation of the afterburner the control unit retains a constant proportionality between the weight of afterburner fuel delivered and the mass of air supplied by the compressor. With any change in air delivery there will be a corresponding change in the pressure $Pt_4$ applied to the bellows 77. Thus with a drop in such pressure the bellows will tend to contract, shifting the scheduling valve 88 rightward. Such shift of the scheduling valve connects the port 94 to drain, so that pressure on the outer face 95 of the actuator head 96 is relieved, permitting the fluid pressure on the inner face 97 of such head to shift the variable area valve's spool 72 in an orifice closing direction. Such shift continues until the resultant relaxation of the spring 78 permits the bellows to distend to its original or null position, and with a restoration of the scheduling valve 88 to its neutral position. Likewise, upon an increase in compressor discharge pressure $Pt_4$, the bellows 77 distends. That shifts the scheduling valve 88 leftward, connecting the port 94 to pressure from port 93 and thus causing pressure fluid to be dispatched to the outer face 95 of the actuator 96. In consequence, the variable area valve's spool 72 is moved in an orifice opening direction, continuing until the scheduling valve 88 is again restored to neutral.

Throughout such operation a constant pressure drop is retained across the variable orifice valve by the action as the $\Delta P$ valve 110 in setting its related slave valve 100, as heretofore described. Consequently, a constant proportionality is retained between mass of air delivered by the compressor and the fuel delivery to the afterburner.

To shut down the afterburner the pilot has only to flip a switch deenergizing the solenoid valve 147. That snaps the selector valve to "off" position, disabling the unit and cutting off supply of afterburner fuel. The same result will ensue if he moves the throttle at any time to a setting less than the minimum required by the throttle override valve 150.

I claim as my invention:

1. In an afterburner fuel control for a turbojet engine including an air compressor and having an afterburner thereon, the combination with a variable-area orifice valve interposable in the fuel supply line to the afterburner, control pressure fluid operated means for positioning said valve independently of fuel pressure in the supply line on either side thereof, a null-point bellows mechanism for actuating said pressure fluid means to position said orifice valve in response to changes in the absolute pressure of air delivered by the engine compressor, and a mechanical feed-back interposed directly between said valve and said bellows mechanism for mechanically feeding back to said bellows a direct applied force proportional to the position of opening of said valve, of a control fluid pressure operated servo mechanism for maintaining constant pressure drop across said orifice valve and comprising a master valve shiftable in opposite directions from a null-point in response to changes in opposite senses from a predetermined value of the pressure drop across said orifice valve, together with valve means acting on the fuel supply to said orifice valve and actuated by control pressure fluid in response to a shift of said master valve for retaining a flow of fuel to said orifice valve commensurate with a constant pressure drop therethrough.

2. In an afterburner fuel control for a turbojet engine including an air compressor and having an afterburner thereon, the combination with a variable-area orifice valve interposable in the fuel supply line to the afterburner, pressure fluid means for positioning said valve independently of fuel pressure in the supply line on either side thereof, a null-point bellows mechanism for actuating said pressure fluid means to position said orifice valve in response to changes in the absolute pressure of air delivered by the engine compressor, and a mechanical feed-back interposed directly between said valve and said bellows mechanism for mechanically feeding back to said bellows a direct applied force proportional to the position of opening of said valve, of a control fluid pressure operated servo mechanism for maintaining a substantially constant pressure drop across said orifice valve and comprising fluid operable valve means for varying the rate of fuel delivery to said orifice, a four-way valve having a sliding spool for controlling the flow of control fluid to and from said fluid operable valve means, means for applying fuel pressure to opposed surfaces of equal area on said four-way valve spool from respectively the up-stream and down-stream sides of said orifice thereby to position said spool for controlling the flow of control fluid to said fluid operable valve means, and a spring arranged to augment the thrust on said spool of the fuel pressure from the down-stream side of said orifice.

3. On an afterburner control for a turbojet engine including an air compressor and having an afterburner thereon, the combination with a variable-area orifice valve interposable in the fuel supply line to the afterburner, pressure fluid means for positioning said valve independently of fuel pressure in the supply line on either side thereof, a null-point bellows mechanism for actuating said pressure fluid means to position said orifice valve in response to changes in the absolute pressure of air delivered by the engine compressor, and a mechanical feed-back interposed directly between said valve and said bellows mechanism for mechanically feeding back to said bellows a direct applied force proportional to the position of opening of said valve, of a control fluid pressure operated servo mechanism for maintaining a substantially constant pressure drop through said orifice valve and comprising fluid operable valve means for varying the rate of fuel delivery to said orifice, a four-way valve having a sliding spool for controlling the flow of control fluid to and from said fluid operable valve means, means for applying fuel pressure to opposed surfaces of equal area on said four-way valve spool from respectively the up-stream and down-stream sides of said orifice thereby to position said spool for controlling the flow of control fluid to said fluid operable valve means, a spring arranged to augment the thrust on said spool of the fuel pressure from the down-stream side of said orifice, and a temperature responsive device subjected to changes in temperature of the fuel arranged in tandem with said spring.

4. An afterburner control for a turbojet engine, comprising, in combination, a variable area orifice valve and null-point balance actuator for positioning said orifice valve and comprising a first bellows supplied with pressure fluid from a compressor on the engine at pressures varying over a wide range of several hundred p.s.i., a second bellows connected in opposition to said first bellows and being substantially evacuated so that said first bellows operates only in accordance with absolute compressor pressures, said variable area orifice valve having a longitudinally shiftable valve element interposed in a fuel supply line to the afterburner, an independent source of control pressure fluid, a control pressure fluid actuator for said orifice valve element operative to move the same positively in opposite directions in accordance with compressor pressure variations, means including a control pressure fluid scheduling valve connected to said bellows for movement in unison with the same and shiftable oppositely from a neutral position for controlling the control pressure fluid to effect corresponding opposite actuation of said actuator thereby to position said orifice valve, and means including a helical compression spring interposed directly between said valve element and said first bellows to afford a mechanical feedback to the latter.

5. An afterburner control for a turbojet engine, comprising, in combination, a variable area orifice valve and null-point balance actuator for positioning said orifice valve and comprising a first bellows supplied with pressure fluid from a compressor on the engine at pressures varying over a wide range of several hundred p.s.i., a second bellows connected in opposition to said first bellows and being substantially evacuated so that said first bellows operates only in accordance with absolute compressor pressures, said variable area orifice valve having a longitudinally shiftable valve element interposed in a fuel supply line to the afterburner, an independent source of control pressure fluid, a control pressure fluid actuator for said orifice valve elements operative to move the same positively in opposite directions in accordance with compressor pressure variations, means including a control pressure fluid scheduling valve connected to said bellows for movement in unison with the same and shiftable oppositely from a neutral position for controlling the control pressure fluid to effect corresponding opposite actuation of said actuator thereby to position said orifice valve, means including a helical compression spring interposed directly between said valve element and said first bellows to afford a mechanical feedback to the latter, a slave valve acting on the afterburner fuel supply to said orifice valve for maintaining a flow of fuel to said orifice valve commensurate with a constant pressure drop therethrough, a control pressure fluid actuator for said slave valve operative to move the same positively in opposite directions, and means including a master pressure drop sensing valve shiftable in opposite directions from a null-point in response to changes in opposite senses from a predetermined value of the pressure drop across said orifice valve for controlling the control pressure fluid to effect corresponding opposite actuation of said slave valve actuator to position said slave valve, all of the foregoing constructed and arranged to supply fuel to an afterburner through a metering orifice controlled directly as a function of the engine compressor pressure and with a constant fuel pressure drop thereacross.

6. In an afterburner control for a turbojet engine, the combination of a variable-area orifice valve interpositionable in a fuel supply line for an afterburner and positionable independently of fuel pressure therein, a slave valve acting on the afterburner fuel supply to said orifice valve for maintaing a flow of fuel to said orifice valve commensurate with a constant pressure drop therethrough, an independent source of control pressure fluid, a control pressure fluid operated actuator for said slave valve operative to move the same positively in opposite directions, and means including a master pressure drop sensing valve shiftable in opposite directions from a null-point in response to changes in opposite senses from a predetermined value of a pressure drop across said orifice valve for controlling the control pressure fluid to effect corresponding opposite actuations of said slave valve actuator thereby to position said slave valve to maintain a constant fuel pressure drop across said orifice valve.

References Cited in the file of this patent

UNITED STATES PATENTS

| | | |
|---|---|---|
| 2,403,371 | Ifield et al. | July 2, 1946 |
| 2,422,808 | Stokes | June 24, 1947 |
| 2,453,413 | De Frees | Nov. 9, 1948 |
| 2,541,805 | Berkey et al. | Feb. 13, 1951 |
| 2,563,012 | Dopp et al. | Aug. 7, 1951 |
| 2,644,482 | McCallum | July 7, 1953 |
| 2,658,483 | Harris | Nov. 10, 1953 |
| 2,688,842 | Oestrich et al. | Sept. 14, 1954 |
| 2,700,275 | Chandler et al. | Jan. 25, 1955 |
| 2,701,949 | Secord et al. | Feb. 15, 1955 |
| 2,703,961 | Harding | Mar. 15, 1955 |
| 2,737,016 | Day | Mar. 6, 1956 |
| 2,739,442 | Neal et al. | Mar. 27, 1956 |
| 2,742,755 | Davies et al. | Apr. 24, 1956 |
| 2,757,511 | Jagger | Aug. 7, 1956 |
| 2,764,868 | Watson et al. | Oct. 2, 1956 |
| 2,765,800 | Drake | Oct. 9, 1956 |
| 2,774,215 | Mock et al. | Dec. 18, 1956 |
| 2,778,191 | Thompson | Jan. 22, 1957 |
| 2,779,158 | Dungan | Jan. 29, 1957 |
| 2,820,340 | Dolza et al. | Jan. 21, 1958 |
| 2,867,269 | Bayer | Jan. 6, 1959 |
| 2,871,659 | Chamberlin et al. | Feb. 3, 1959 |